Dec. 27, 1938.  H. H. GORRIE  2,141,464
REGULATING APPARATUS
Filed Oct. 22, 1934  2 Sheets-Sheet 1

INVENTOR
Harvard H. Gorrie
BY
Raymond D. Junkins
ATTORNEY

Dec. 27, 1938.  H. H. GORRIE  2,141,464
REGULATING APPARATUS
Filed Oct. 22, 1934   2 Sheets-Sheet 2

INVENTOR
Harvard H. Gorrie
BY
Raymond H. Jenkins
ATTORNEY

Patented Dec. 27, 1938

2,141,464

UNITED STATES PATENT OFFICE 2,141,464

REGULATING APPARATUS

Harvard H. Gorrie, Cleveland Heights, Ohio, assignor to Bailey Meter Company, a corporation of Delaware Application October 22, 1934, Serial No. 749,503

7 Claims. (Cl. 236—86)

This invention relates to regulating apparatus, and more particularly for maintaining substantially constant any desired electrical, thermal, chemical, physical or other variable condition through the control of a corrective agent. Preferably the amount of change in the rate of application of the agent which effects, produces, or maintains the condition, for unit change in the condition, or that function which I for convenience define as the sensitivity of the regulating apparatus, may be readily varied in accordance with the constants of the system to which the regulating and control apparatus is applied.

Further, in accordance with my invention the magnitude of the controlled condition, or the standard value of the condition which is to be maintained, may be readily varied as desired.

Furthermore the sense of change in the agent effecting, producing or maintaining the controlled condition, initiated by a change in the value of the condition, may be readily changed in accordance with the requirements of the system.

Additionally the means for changing the sensitivity and/or the standard of magnitude of the condition are embodied in rugged members specifically provided for and adapted to that purpose, and do not act on delicate moving parts such as those which are positioned directly responsive to the value of the condition under control.

Figure 1:
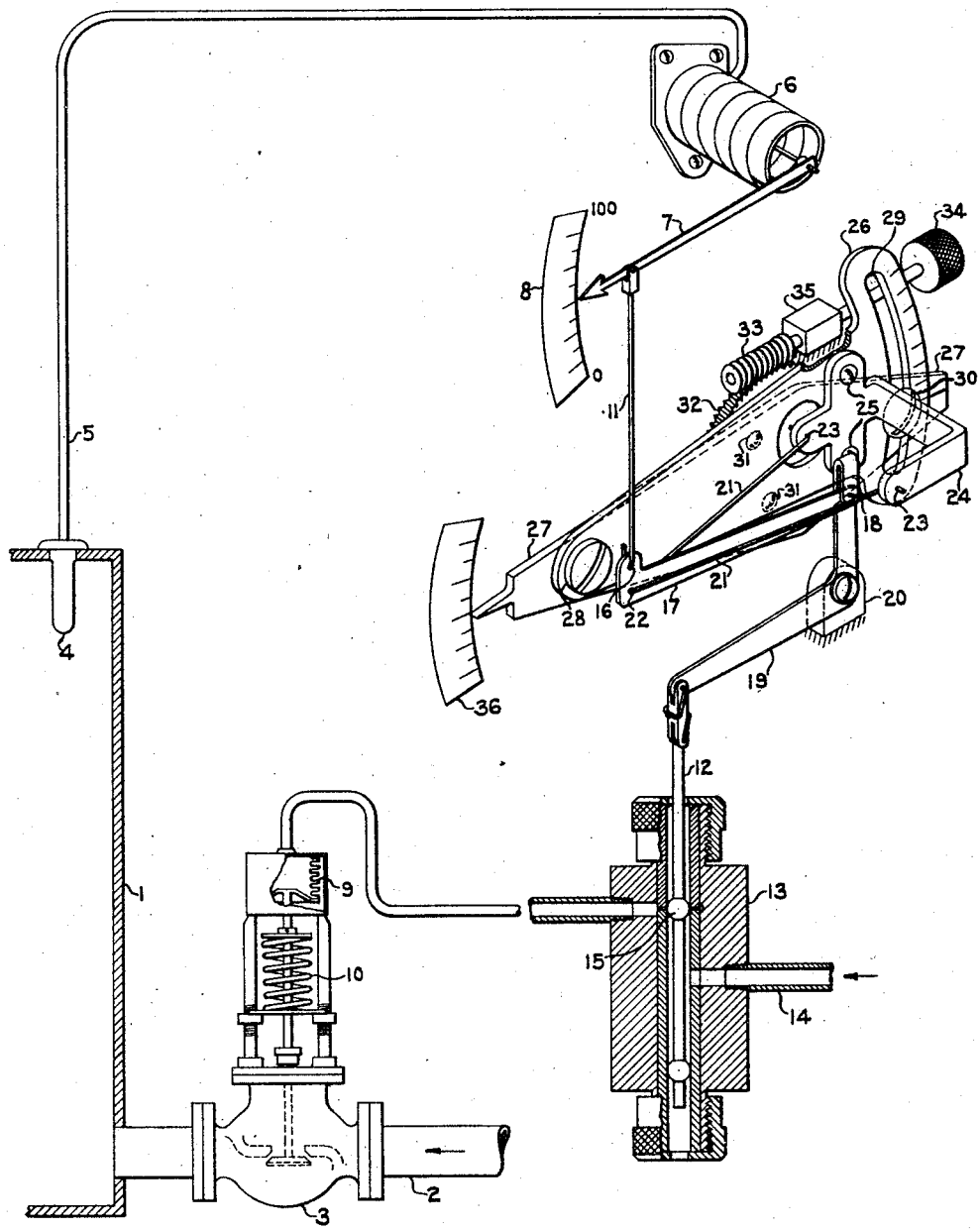
Fig. 1 is a somewhat diagrammatic representation of one form of my regulating apparatus applied to the maintenance of a variable condition through control of a corrective.

Referring to Fig. 1 I show therein a heating tank 1 which is supplied by a heating fluid, or agent, such for example as steam through a supply conduit 2. It is to be understood however that I am illustrating and describing only one preferred form of my invention and am not to be limited thereto.

Positioned in the conduit 2 is a valve 3, adapted to regulate the flow of steam to the tank to maintain the temperature therein substantially at a predetermined magnitude. Located within the tank is a thermometer bulb 4 connected through a capillary 5 to a Bourdon tube 6 having a pointer 7 positioned relative to an index 8 to indicate visually the instantaneous value of temperature within the tank 1.

The regulating apparatus embodying my invention, and which I will describe in connection with the drawings, is adapted to control the flow of steam through the conduit 2 to maintain the temperature within the tank substantially constant at a predetermined magnitude or standard. The valve 3 is adapted to be actuated by a pressure fluid motor comprising a bellows 9, having an opposing loading spring 10. When the temperature to which the bulb 4 is sensitive increases above the desired magnitude, the system as a whole functions to decrease the fluid pressure effective upon the interior of the bellows 9, thereby tending to close the valve 3 and thus decrease the rate of supply of the heating medium to the tank.

Pivotally suspended from the pointer 7 is a member 11, which through suitable linkage, later to be described, is adapted to vertically position a valve member, or pilot stem 12, in a pilot casing 13 for controlling the value of the fluid pressure effective within the bellows 9. The pilot valve assembly 12, 13 is illustrated and will be described as of the type disclosed and claimed in the co-pending application of Clarence Johnson, Serial No. 673,212, although not limited thereto. Fluid pressure is supplied to the casing 13 through a pipe 14 from a source (not shown) of substantially constant pressure, and continually bleeds to the atmosphere through both ends of the casing 13 past lands 15, which are formed on the valve member 12. The continual bleeding of fluid pressure from the supply 14 to the atmosphere results in a pressure gradient along the surface of the lands 15, and vertical positioning of the member 12 and correspondingly of the lands 15, results in the availability of a pressure within the bellows 9, ranging from that of the supply 14 to that of the atmosphere.

For every position of the valve member 12 vertically there will be a definite pressure within the bellows 9 and correspondingly a definite position of opening of the valve 3. If the member 11 were connected directly with the member 12, it could be said that for every temperature within the tank 1 there would be a definite opening of the valve 3 and correspondingly a definite rate of flow of the heating agent to the tank.

The type of control just described is commonly termed a positioning or geared control, as a definite relation exists between the magnitude of the condition (temperature) being controlled and the rate of application of the agent (steam) producing or affecting that condition. The change in magnitude of temperature necessary to produce full change in rate of application of the steam is commonly termed the geared range and it is evident that at one extreme the geared range approaches an "on-off" control wherein wherever the temperature is above the desired standard, then steam is applied at a maximum rate, while whenever temperature is below the desired standard then steam is supplied at the minimum rate. At the other extreme, regardless of changes in the temperature, no change would occur in the rate of application of the steam or heating medium. A control system having a relatively small geared range is known as a control of high sensitivity, whereas a control system having a large geared range is known as a control of low sensitivity.

Different manufacturing processes may require control apparatus of various sensitivities. This is due, for example, to the different heat storage capacities, different rates of response of the control condition, changes in the rate of application of the agent, different physical sizes, different locations of the temperature sensitive bulb or other condition measuring device with respect to the source of the agent applied, or differences in other conditions affecting the responsiveness of the process to control and which for convenience I collectively term the "constants" of the system or process.

If the geared range is too small, or in other words if the sensitivity of the control is too high with respect to the constants of the system a condition known as "hunting" results, wherein the controlled condition rises above and falls below the predetermined standard in a pronounced cycle; conversely if the geared range is too great, or in other words the sensitivity is too low with respect to the constants of the system, the controlled condition will tend to drift in one direction or the other from the predetermined standard over long periods of time. It is apparent therefore that if a control apparatus is to be applicable to a wide variety of systems or processes, means should preferably be provided for varying the sensitivity of the control and, as hereinafter described, my control is provided with means for readily varying the sensitivity to meet the requirements of the particular system to which it is applied.

According to Fig. 1, when the member 11 is positioned downwardly, due to a decrease in temperature within the tank 1, then the valve member 12 will be positioned upwardly, increasing the pressure of fluid effective within bellows 9, thus forcing the valve 3 to a more nearly open position and thus increasing the rate of supply of steam to the tank. Conversely, should the temperature within the tank increase, then the member 11 will be positioned upwardly, thereby causing the valve member 12 to move downwardly and decreasing the pressure of the fluid within the bellows 9, tending to close the valve 3 and lessen the rate of steam supply to the tank.

The member 11 is pivoted at 16 to a connecting rod 17, whose opposite end is pivoted at 18 to one arm of a bell crank 19. The bell crank is pivoted at its elbow to a fixed part 20, and its other arm is pivotally connected to the valve member 12. Arms 21 formed as a V straddle the connecting rod 17 pivoted thereto at 22 adjacent the pivot 16 and at their free ends are pivoted as at 23 to a bracket 24. The pivots 23 are aligned and the bracket 24 is held by the screws 25 to a support 26.

As shown in Fig. 1 the connecting rod 17 is substantially normal to the member 11 and the pivots 23 are displaced slightly above axial alignment with the pivot 18. Upon upward positioning of the member 11 by the Bourdon tube 6, the pivot 16 will be positioned above the pivots 23 as centers, which will then be effective for producing a lateral motion of the connecting rod 17 and a counterclockwise movement of the bell crank 19 to effect a downward positioning of the valve member 12, thereby decreasing the fluid pressure effective within the bellows 9, and tending to close the valve 3. Conversely upon downward positioning of the member 11, the lateral motion of the connecting rod 17 will produce a clockwise movement of the bell crank 19 about its pivot 20, effecting an upward positioning of the valve member 12 and an opening of the valve 3.

Figure 2:
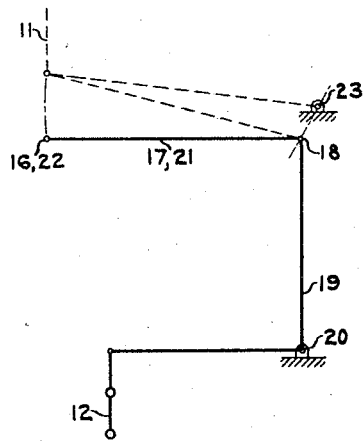
Figs. 2, 3 and 4 are schematic diagrams illustrating the principle of operation of a part of Fig. 1.

To aid in an understanding of my invention, I illustrate in Fig. 2 the connecting linkage between the Bourdon tube 6 and the valve member 12 in diagrammatic form. The pivots 23 are axially aligned with the pivot 18. When the member 11 is positioned upwardly to the position shown in dotted line, the bell crank 19 will remain stationary due to the fact that the pivots 23 and 18 are axially aligned, and both the connecting rod 17 and the forked member 21 move around the same centers. This then may be described as a position of zero sensitivity, for regardless of the displacement of the member 11 there will result no angular positioning of the bell crank 19 or vertical positioning of the valve member 12; accordingly the rate of application of steam to the tank 1 will remain constant regardless of the change in value of temperature.

Figure 3:
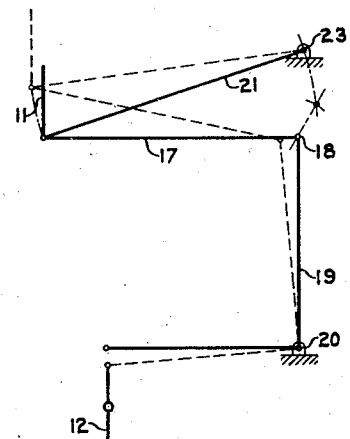

In Fig. 3 I show the pivots 23 located upwardly from a position of axial alignment with the pivot 18 and thus substantially the same as the showing of Fig. 1, so that Fig. 3 may be taken as a diagrammatic illustration of the apparatus of Fig. 1. With the pivots 23 displaced from a position of axial alignment with the pivot 18, then when the member 11 is positioned upwardly to the position shown in dotted line the bell crank 19 will be positioned counter-clockwise about its pivot 20, producing a downward positioning of valve member 12. It is apparent that the greater the displacement of the pivots 23 from axial alignment with the pivot 18 the greater will be the displacement of the valve member 12 produced for any given displacement of member 11, and that therefore the sensitivity of the control apparatus may be readily varied through the desired range, until reconciled to the constants of the system to which it is applied, by varying the relative alignment of the pivots 23, 18.

In certain applications it may be desirable to produce the reverse action of the control valve 3, as for example the regulating apparatus might be used to maintain the level of a liquid within a tank at some predetermined height by controlling the outflow of liquid from the tank. In such an instance it would be desirable upon an increase in level to open the drain valve, and to do so it would be necessary to increase the pressure within the bellows 9 upon an increase of the condition (level) within the tank. This being the reverse action of that previously described, wherein for an increase in value of the condition I decribed a decrease in pressure within the bellows 9. The regulating apparatus which I have provided may be readily adjusted to produce motion of the valve 3 or other control device in either direction upon an increase in the controlled condition above the desired magnitude.

Figure 4:
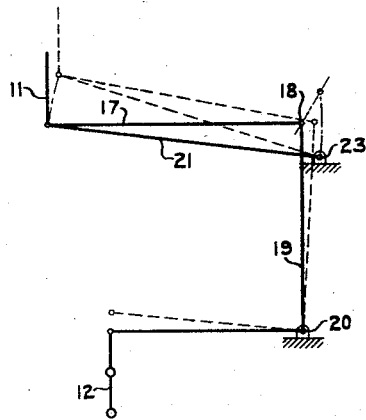

In Fig. 4 I have shown the pivots 23 angularly displaced below the pivot 18. Under this condition, when the member 11 is displaced upwardly to the dotted position, then the valve member 12 is positioned upwardly in reverse sense to the showing of Fig. 3.

By the simple expedient therefore of positioning the pivots 23 from the position of zero sensitivity (Fig. 2) in predetermined sense and amount, I am able to produce any desired sensitivity or sense of action of the control valve, or other device for regulating the rate of application of the corrective agent (in this case steam). That is, the amount of positioning of the pivots 23 from a position of axial alignment with the pivot 18, will determine the displacement of the valve member 12 produced by a given displacement of the member 11, and the direction of the positioning above or below the pivot 18 will determine the sense of displacement of the valve member 12 relative to the direction of displacement of the member 11. Accordingly, my regulating apparatus may readily be shifted or varied in sensitivity in accordance with the constants of the system to which it is applied and may further readily be adjusted to either a direct or reverse action in accordance with the requirements of the system.

Referring again to Fig. 1, I therein disclose a means for readily positioning the pivots 23 out of alignment with the pivot 18, comprising a base 27 to which the support 26 is pivoted at 28. The support 26 is provided with a curved slot 29, through which extends an adjusting screw 30 threaded into the base 27 and adapted when tightened to hold the support 26 firmly against the base 27. It will be appreciated that rather than the slot 29 and screw 30 I may provide a micrometer adjustment of the support 26 relative to the base 27 around the pivot 28.

The support 26 may be graduated along the edge of the slot 29 to cooperate with a pointer or marker line on the end of the base 27, and may be graduated as desired in units to show the degree of sensitivity of the control.

I desirably adjust dimensions and arrangement of parts so that when the temperature within the tank is of predetermined value, as indicated by the position of the pointer 7 relative to the index 8, then the pivot 28 and the pivot 18 will be substantially aligned. Adjustment of the support 26 to give a desired sensitivity will then not produce motion of the bell crank 19 other than as produced through displacement of the member 11 by the Bourdon tube 6. However while I prefer that the pivots 18, 28 be substantially aligned, this is not absolutely necessary, for other arrangements may dictate locations which will produce the desired results.

It is to be understood that the displacements illustrated in Figs. 2, 3 and 4 are merely illustrative and that in actual construction the angular displacement of the bell crank 19, which is necessary to produce a full travel of the valve 3, may be either increased or decreased. For example, it may be desirable that a displacement of the valve member 12 in the nature of a few thousandths of an inch be sufficient to actuate the valve 3 from one extreme of travel to the other, and that this displacement be produced by full scale movement of the Bourdon tube 6, or that such displacement of the valve member 12 be produced by a small percentage of full scale deflection of the Bourdon tube. The values of displacement and sensitivity ratios which have been used are merely as an aid to the understanding of the invention and are by no means restrictive.

Different processes to which the control and regulating apparatus may be applied require different magnitudes of controlled condition to be maintained. Furthermore in any particular system or process to which the apparatus may be applied there may be certain periods of time when it will be desirable to maintain one magnitude of the controlled condition as standard and during other periods of time to maintain an entirely different magnitude. It is therefore highly desirable that the regulating apparatus be provided with means for readily varying the standard to which the apparatus is to work.

In Fig. 1, I have illustrated a ready means for varying the standard of the controlled condition to be maintained and which I will now describe. The base 27 is rigidly secured as by the screws 31 to a worm wheel 32 which in turn is adapted to rotate around a shaft (not shown) through the agency of a worm 33 turned by a knob 34. The shaft of the worm 33 is carried through a fixed bearing 35, while the shaft of the worm wheel 32 is also carried in a fixed bearing (not shown).

It will therefore be observed that through the agency of the knob 34 I may rotate the worm wheel 32 and with it the base 27, the support 26, and the bracket 24, around the center of the worm wheel.

Rotation in this manner of the pivots 18, 23 serves to vary the position of the valve member 12 for a given position of the Bourdon tube 6. In other words, the relation existing between the rate of application of the corrective agent and the magnitude of the condition within the utilizing device may be varied by means of the apparatus provided. A movement of the worm 33 serves to vary the relationship existing between the position of the movable member 11 and the valve member 12.

The base 27 may be provided with a pointer cooperating with a suitably graduated scale 36 to exhibit the magnitude of the condition to be maintained, that is the standard to which the apparatus is to work.

If the temperature at the bulb 4 is the same as the standard, then the pointer 7 will indicate relative to the index 8 the same value as the end of the base 27 indicates relative to the index 36. Departure of actual temperature above or below the standard, results in a positioning of the valve 3 to admit more or less steam, thereby tending to vary the temperature within the tank 1 in a sense to return the actual temperature to the desired temperature.

I am aware that the invention may be embodied in other forms without departing from the spirit or essential attributes thereof; that the regulating apparatus is capable of a wide variety of applications, and it may be used with different types of selective devices or pilot valves employing different types of motive power for operation and I therefore desire the present embodiment to be considered in all respects as illustrative and not restrictive; reference being had to the appended claims rather than to the foregoing description to indicate the scope of the invention.

What I claim as new, and desire to secure by Letters Patent of the United States, is:

1. In control apparatus for maintaining a condition at a desired magnitude, in combination, a movable member positioned in accordance with changes in the condition, a fixed support, a crank arm pivotally connected to said fixed support and to said movable member, means for angularly positioning said fixed support about a fixed center substantially coincident with the pivot connection between said movable member and said crank arm, means for angularly positioning said fixed center and said fixed support about a second fixed center, and means for regulating the application of an agent affecting the condition in accordance with the position of said member.

2. In control apparatus for maintaining a condition at a desired magnitude, in combination, a movable member positioned in accordance with changes in the condition, a fixed support, a crank arm pivotally connected to said fixed support and to said movable member, means for angularly positioning said fixed support about the pivot connection with said movable member, and means for regulating the application of an agent affecting the condition in accordance with the position of said member.

3. In control apparatus for maintaining a condition at a desired value, means for regulating the sensitivity of said control comprising a member positioned in accordance with the magnitude of the condition, a support adapted to be positioned about a fixed center, a crank arm pivotally connected to said member and to said support, and means for regulating the application of an agent for affecting the condition controlled by said member.

4. In control apparatus for maintaining a condition at a desired value, means for regulating the sensitivity of said control comprising a member positioned in accordance with the magnitude of the condition, a support adapted to be positioned about a fixed center, a crank arm pivotally connected to said fixed support and to a point on said member coincident with the fixed center of said support, and means for regulating the application of an agent for affecting the condition controlled by said member.

5. In control apparatus for maintaining a condition at a desired magnitude, means for regulating the sensitivity of said control and the magnitude of the condition maintained by said control comprising a structure adapted to be angularly positioned about a fixed center, a support pivoted to said structure, means for positioning said support relative to said structure about said pivot, a movable member positioned in accordance with the magnitude of the condition, a crank arm connected to said member at a point substantially coincident with the pivoted connection between said structure and said support and to said support at a point substantially coincident with said fixed center, a bell crank, a connecting rod connected to said bell crank and to said movable member at points substantially aligned with the connections between said structure and said support, and said crank arm and said movable member respectively, and control means actuated by said bell crank.

6. In control apparatus for maintaining a condition at a desired magnitude, in combination, a movable member positioned in accordance with changes in the condition, a fixed support, a crank arm pivotally connected to said fixed support and to said movable member, co-operating means whereby said fixed support may be positioned to any point in a plane having predetermined limits, and means for regulating the application of an agent affecting the condition in accordance with the position of said member.

7. In a control system, in combination, a device sensitive to the controlled condition, a movable member positioned by said sensitive device, a bell crank, a connecting rod between said movable member and said bell crank, a fixed support, a crank arm having substantially the same length as said connecting rod and pivoted to said movable member and said fixed support, means for angularly positioning said fixed support about the connection between said movable member and said connecting rod, and means for regulating the application of an agent affecting the condition actuated in accordance with the position of said bell crank.

HARVARD H. GORRIE.